United States Patent
Bothe et al.

(10) Patent No.: US 7,066,862 B2
(45) Date of Patent: Jun. 27, 2006

(54) METHOD FOR A SHIFT CONTROL OF A POWER SHIFT TRANSMISSION

(75) Inventors: Edgar Bothe, Peine (DE); Uwe Hinrichsen, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 133 days.

(21) Appl. No.: 10/826,553

(22) Filed: Apr. 16, 2004

(65) Prior Publication Data

US 2004/0198552 A1   Oct. 7, 2004

Related U.S. Application Data

(63) Continuation of application No. PCT/EP02/10631, filed on Sep. 21, 2002.

(30) Foreign Application Priority Data

Oct. 31, 2001 (DE) ................ 101 53 722

(51) Int. Cl.
*F16H 61/04* (2006.01)
*F16H 61/26* (2006.01)
*G06F 17/00* (2006.01)

(52) U.S. Cl. .......... 477/143; 477/156; 701/52
(58) Field of Classification Search ........ 477/127, 477/128, 143, 155, 156, 180; 74/340; 701/60, 701/64, 52

See application file for complete search history.

(56) References Cited

U.S. PATENT DOCUMENTS

| | | | |
|---|---|---|---|
| 5,251,443 A | | 10/1993 | Ehrlinger et al. |
| 5,393,275 A | * | 2/1995 | Okada et al. .......... 477/81 |
| 6,101,438 A | | 8/2000 | Staiger et al. |
| 6,159,129 A | * | 12/2000 | Holbrook et al. ........ 477/143 |
| 6,199,003 B1 | * | 3/2001 | Hollingsworth et al. ..... 701/52 |
| 6,319,172 B1 | * | 11/2001 | Steinmetz et al. ....... 477/143 |

FOREIGN PATENT DOCUMENTS

| | | |
|---|---|---|
| DE | 40 26 658 A1 | 2/1991 |
| DE | 691 15 629 T2 | 4/1992 |
| DE | 195 46 292 A1 | 6/1997 |
| EP | 0 315 596 A2 | 5/1989 |
| EP | 0 479 737 B1 | 4/1992 |
| JP | 406002761 A * | 1/1994 ....... 477/143 |
| JP | 406235451 A * | 8/1994 ....... 477/156 |

* cited by examiner

*Primary Examiner*—Roger Pang

(57) ABSTRACT

A method for a shift control of a power shift transmission includes closing an incoming, engaging clutch unit assigned to a new gear and opening the outgoing, disengaging clutch unit assigned to an old gear such that the closing and the opening overlap in time. The incoming clutch unit is closed after performing a filling operation for providing a filling pressure for the incoming clutch unit. The filling operation is concluded by a filling end. In case of a manually triggered power shift, the filling operation for the incoming clutch unit is performed with an increased filling pressure corresponding to an order of magnitude of the clutch capacity of the outgoing clutch unit. After the filling end is identified, the outgoing clutch unit is opened and, overlapping in time, a clutch capacity of the incoming clutch unit is adapted.

15 Claims, 2 Drawing Sheets

METHOD FOR A SHIFT CONTROL OF A POWER SHIFT TRANSMISSION

CROSS-REFERENCE TO RELATED APPLICATION

This application is a continuation of copending International Application No. PCT/EP02/10631, filed Sep. 21, 2002, which designated the United States and was not published in English.

BACKGROUND OF THE INVENTION

FIELD OF THE INVENTION

The invention relates to a method for a shift control of a power shift transmission, in particular of a motor vehicle, wherein, with a time overlap, an incoming or engaging clutch unit assigned to a new gear is closed and an outgoing or disengaging clutch unit assigned to the old gear is opened.

A power shift transmission is a gear shift or gear change transmission, in which, during a gear change, the transmission of force from the engine to the driven wheels of the motor vehicle is maintained. In other words, there is no interruption in traction in the event of a traction upshift in the traction mode of the motor vehicle and there is no interruption in thrust in the event of an overrun downshift in the overrun mode of the motor vehicle. Conventional types of power shift transmissions include automatic transmissions and twin clutch transmissions. In an automatic transmission, which has a single input shaft usually following a torque converter, a gear change, that is to say a change of the effective transmission ratio, is achieved in that at least a first transmission component of a planet gear set is released from the input shaft or the transmission case due to the opening of an assigned clutch or brake, and a second transmission component is connected to the input shaft or detained with respect to the transmission case due to the closing of a clutch or brake assigned to the second transmission component.

In the case of a twin clutch transmission which has two input shafts, each with an engine clutch and with a group of gears assigned alternately in a rising sequence, a gear change is implemented in that, after the selection of the new gear, the engine clutch assigned to the old gear is opened and the engine clutch assigned to the new gear is closed. Apart from an in-transmission selection of the new gear and the deselection of the old gear in the twin clutch transmission, the shift operations take place essentially identically in both types of transmission, to be precise in such a way that an incoming clutch unit, which operates as a force-locking clutch and is assigned to the new gear, is closed and an outgoing clutch unit, which operates as a force-locking clutch and is assigned to the old gear, is opened, wherein the closing and opening of the clutch units takes place with a time overlap in order to maintain the power transmission. In other words, the clutch capacity of the incoming clutch unit is increased to the same extent as the clutch capacity of the outgoing clutch unit is decreased. The clutch units which operate as force-locking clutches and are suitable for use for this purpose are usually hydraulically controllable wet clutches in the form of multiple disk clutches which take up only a small amount of construction space, can be produced cost-effectively and can be controlled accurately via the operating pressure in the pressure space assigned in each case, this being the basic precondition for the overlapped control of a gear change.

Multiple disk clutches regulated by continuous slip are especially suitable for a control of this kind, since, in these clutches, the transmittable torque (clutch capacity) is in each case proportional to the working pressure, active as a pressure force, in the respective pressure space. Where a wet clutch of this type is concerned, the actual closing of the incoming (engaging) clutch unit assigned to the new gear is preceded by a filling phase, in which the assigned pressure space is filled until the assigned clutch elements (clutch disks) are applied and the transmission of a small drag torque commences. The filling pressure, which is reached at the end of filling, normally corresponds to a torque which corresponds to about 10% of the torque currently transmittable in the outgoing (disengaging) clutch unit and is of the order of magnitude of 20 Nm to 30 Nm.

Conventionally, the filling of the incoming clutch unit requires 200 ms to 400 ms, even up to 1000 ms under cold conditions. A maximum filling duration is therefore provided, in which, under the most unfavorable operating conditions, that is to say during a cold start in extremely cold conditions with a correspondingly viscous pressure medium (hydraulic oil), the filling of the pressure space up to the application of the assigned clutch elements is reliably achieved before the clutch overlap can commence with a corresponding delay.

Modern automatic transmissions and power shift transmissions are conventionally controlled automatically via an electronic control apparatus, but increasingly also have a manual mode in addition to an automatic mode. In the automatic mode, the shift operations are triggered and carried out as a function of vehicle parameters, such as, for example, the current driving speed, the engine rotational speed and the engine load, in which case the shift points can be determined differently as a function of a selected control program (economy or sport). In the automatic mode, the driver is appreciably surprised by the respective shift operation. Since, in this case, the duration of the filling phase cannot be perceived, the shift operation is felt by the driver to be more or less comfortable or sporty depending on the closing and opening profile of the two clutch units. In the manual mode, which can be activated by the positioning of the selector lever in a separate manual shift gate or simply by the actuation of shift elements disposed in the steering wheel region, such as, for example, +/− switches in the steering wheel or +/− shift stalks behind the steering wheel, the shift operation is triggered in each case manually by the driver, but the shift operation itself then proceeds in the same way, controlled automatically, as in the automatic mode. In the case of manual triggering, the shift operation is then often perceived by the driver, especially when the driver prefers a dynamic sporty drive, to be insufficiently spontaneous and, overall, to take place too slowly.

Although it is known, in principle, to accelerate hydraulically controlled shift operations by an increase in the working pressure, this cannot readily be applied to an overlapped gear change. For example, Published, Non-Prosecuted German Patent Application DE 40 26 658 A1 and correspondingly U.S. Pat. No. 5,251,443 disclose a pressure control device for influencing the closing behavior of power shift clutches of a power shift transmission. The pressure control device has a single regulating valve whose control characteristic can be adapted individually to a plurality of power shift clutches or to the gear steps assigned to these by cutting in and cutting out a pressurizing piston device and an additional throttle. By the pressurizing piston device being cut in, an increased final filling pressure is achieved, and the filling phase of the respective power shift clutch is prolonged, and, because of the increased initial frictional pressure (corresponding to a final filling pressure), a shorter slipping phase and consequently a harder shift are correspondingly obtained. By using the additional throttle, which is provided in parallel to a permanently used throttle and is being cut in a control line of the regulating valve, the pressure gradient of the slipping phase is increased. As a result, the slipping phase is shortened and the shift is harder. Overall, however, no appreciable shortening in the shift process is achieved. Moreover, in the case of a relatively rapid rise in the working pressure of the incoming clutch unit, there is the risk that a twisting or tensioning of the power shift transmission occurs if the opening of the outgoing clutch cannot take place quickly enough.

SUMMARY OF THE INVENTION

It is accordingly an object of the invention to provide a method for controlling the shifting of a power shift transmission which overcomes the above-mentioned disadvantages of the heretofore-known methods of this general type and through the use of which, in the case of a power shift transmission of the above-mentioned type, the process of a manually triggered power shift, which may be a traction upshift or an overrun downshift, is accelerated substantially, without a twisting or tensioning occurring in the transmission, so that a driver experiences a spontaneous reaction to the driver's shift command and a rapid execution of the desired shift operation.

With the foregoing and other objects in view there is provided, in accordance with the invention, a method for a shift control of a power shift transmission, the method including the steps of:
providing slip-regulated wet clutches operating respectively as an incoming clutch unit and an outgoing clutch unit;
closing the incoming clutch unit assigned to a new gear and opening the outgoing clutch unit assigned to an old gear such that the closing and the opening overlap in time;
closing the incoming clutch unit substantially up to a working pressure corresponding to a clutch capacity of the outgoing clutch unit after performing a filling operation for providing a filling pressure for the incoming clutch unit, the filling operation being concluded by a filling end; and
performing, in case of a manually triggered power shift, the filling operation for the incoming clutch unit with an increased filling pressure corresponding to an order of magnitude of the clutch capacity of the outgoing clutch unit, ascertaining the filling end, and after the filling end is identified, opening the outgoing clutch unit and adapting a clutch capacity of the incoming clutch unit such that the opening of the outgoing clutch unit and the adapting of the clutch capacity overlap in time.

Another mode of the method according to the invention includes setting the filling pressure of the incoming clutch unit at substantially between 80% and 90% of a pressure level corresponding to the clutch capacity of the outgoing clutch unit.

A further mode of the method according to the invention includes setting the filling pressure of the incoming clutch unit at substantially 100% of a pressure level corresponding to the clutch capacity of the outgoing clutch unit.

Another mode of the method according to the invention includes accelerating the step of opening the outgoing clutch unit by switching the outgoing clutch unit pressureless via a throttle that is enlarged in comparison with a throttle for a normal operation.

Yet another mode of the method according to the invention includes ascertaining the filling end of the incoming clutch unit by sensing a working pressure in a pressure space of the incoming clutch unit and/or ascertaining the filling end of the incoming clutch unit by determining a pressure gradient of a working pressure in a pressure space of the incoming clutch unit.

Another mode of the method according to the invention includes interpreting a reaching and overshooting of a given pressure limit value in the incoming clutch unit as the filling end.

A further mode of the method according to the invention includes interpreting an overshooting or undershooting of a given pressure gradient value in the incoming clutch unit as the filling end.

Another mode of the method according to the invention includes ascertaining the filling end of the incoming clutch unit by sensing a commencing twisting of a power shift transmission.

Yet another mode of the method according to the invention includes sensing a vehicle acceleration or vehicle deceleration; and interpreting a reaching and undershooting of a given acceleration limit value or given deceleration limit value as the filling end.

Another mode of the method according to the invention includes sensing a working pressure in a pressure space of the outgoing clutch unit; and interpreting a reaching and undershooting of a given pressure limit value in the outgoing clutch unit as the filling end.

Another mode of the method according to the invention includes sensing a transmission-side rotational speed and a wheel-side rotational speed of a driven-side drive train; and interpreting a reaching and overshooting of a given positive difference between the wheel-side rotational speed and the transmission-side rotational speed as the filling end.

A further mode of the method according to the invention includes performing at least two ascertaining steps selected from the group of ascertaining the filling end of the incoming clutch unit by sensing a working pressure in a pressure space of the incoming clutch unit, ascertaining the filling end of the incoming clutch unit by determining a pressure gradient of a working pressure in a pressure space of the incoming clutch unit, ascertaining the filling end of the incoming clutch unit by interpreting a reaching and overshooting of a given pressure limit value in the incoming clutch unit, ascertaining the filling end of the incoming clutch unit by interpreting an overshooting or undershooting of a given pressure gradient value in the incoming clutch unit, ascertaining the filling end of the incoming clutch unit by sensing a commencing twisting of a power shift transmission, ascertaining the filling end of the incoming clutch unit by sensing a vehicle acceleration or vehicle deceleration and interpreting a reaching and undershooting of a given acceleration limit value or given deceleration limit value, ascertaining the filling end of the incoming clutch unit by sensing a working pressure in a pressure space of the outgoing clutch unit and interpreting a reaching and undershooting of a given pressure limit value in the outgoing clutch unit, and ascertaining the filling end of the incoming clutch unit by sensing a transmission-side rotational speed and a wheel-side rotational speed of a driven-side drive train and interpreting a reaching and overshooting of a given positive difference between the wheel-side rotational speed and the transmission-side rotational speed; evaluating respective results of the at least two ascertaining steps and deriving respective result values from the respective results of the at least two ascertaining steps; forming an evaluation sum by adding up the respective result values; and interpreting a reaching and overshooting of a given sum limit value by the evaluation sum as the filling end.

Another mode of the method according to the invention includes performing the filling operation with the increased filling pressure in case of a manually triggered traction upshift or overrun downshift in a motor vehicle.

In other words, according to the invention, there is provided a method for the shift control of a power shift transmission, in particular of a motor vehicle, in which, with a time overlap, an incoming clutch unit K2 assigned to the new gear $G_Z$ is closed and an outgoing clutch unit K1 assigned to the old gear $G_Q$ is opened, the clutch units K1, K2 being configured as wet clutches with slip regulation, the closing of the incoming clutch unit K2 taking place approximately up to a working pressure corresponding to the clutch capacity $M_{K\_S}$ of the outgoing clutch unit K1, and the closing of the incoming clutch unit K2 being preceded by a filling with a filling pressure $p_F$, the filling being concluded by a filling end, wherein, in the event of a manually triggered power shift (traction upshift and overrun downshift), the filling of the incoming clutch unit K2 with an increased filling pressure $p_F$ corresponding to the order of magnitude of the clutch capacity $M_{K\_S}$ of the outgoing clutch unit K1 takes place, wherein the filling end is determined, and wherein, with the filling end detected, with a time overlap, the outgoing clutch unit K1 is opened and the clutch capacity $M_{K2}$ of the incoming clutch unit K2 is adapted.

By the incoming clutch unit being filled with a markedly increased filling pressure, the filling phase is reduced substantially and then lasts for about 50 ms to 100 ms, even up to 150 ms under extremely cold conditions. In order to avoid a twisting or tensioning of the transmission, the filling end is determined, that is to say suitable physical variables of the drive train are sensed and evaluated, and, with the filling end detected, the outgoing clutch unit is opened and the incoming clutch unit is adapted, that is to say is set as a function of the reduction in the transmittable torque of the outgoing clutch unit to the desired clutch capacity which corresponds approximately to the clutch capacity of the outgoing clutch before the shift operation. The filling pressure of the incoming clutch unit can be set at about 80% to 90% or else to about 100% of the pressure level which corresponds to the clutch capacity of the outgoing clutch unit. The adaption of the incoming clutch unit then means, in the first case, a rise and a fine adjustment and, in the second case, only a fine adjustment of the working pressure to the required pressure level for transmitting the current engine torque. Since the processing of the sensor signal and the triggering of the clutch overlap takes only approximately 50 ms from the sensing of the filling end onward, and also the actual gear change takes up markedly less time because of the raised filling pressure of the incoming clutch unit, the overall shift duration is reduced to between 150 ms and 300 ms as compared to 400 ms to 1000 ms in the prior art. The shift operation triggered by a driver is consequently implemented spontaneously and quickly. The driver thus notices an appreciable improvement in shift spontaneity when the method according to the invention is used.

In order to achieve a rapid opening of the outgoing clutch unit, the assigned pressure space is expediently emptied or switched to pressureless via a throttle which is enlarged, as compared with normal operation, that is to say in the case of shifts in the automatic mode and in the case of low-power shifts in the manual mode. For this purpose, it is conceivable that a changeover is made via a switching valve between a smaller throttle for normal operation and a parallel-arranged larger throttle for "dynamic operation" according to the invention, or that, in the case of "dynamic operation", a further parallel-arranged throttle is cut into the smaller throttle via a switching valve in order to increase the throughflow cross section.

The filling end of the incoming clutch unit can be determined by sensing the working pressure and/or by determining the pressure gradient of the working pressure in a pressure space of the incoming clutch unit. During the filling phase, the pressure in the pressure space initially rises only insignificantly due to flow losses, but then, with decreasing volume flow, rises sharply before the end of the filling phase, and, toward the end of the filling phase, reaches the selected filling pressure with the clutch disks being applied. For sensing the filling end, therefore, a pressure sensor may be used which is connected directly to the pressure space of the incoming clutch unit and through the use of which the currently active working pressure in the pressure space can be measured and can be fed to an evaluation unit, in which the measured pressure can be compared with a predetermined limit value and a difference quotient can be formed with at least one of the last measurement values and the corresponding time difference for determining the instantaneous pressure gradient and can be compared with a predetermined limit value. As a result, the reaching and overshooting of a predefined pressure limit value, for example of 90% or 95% of the desired value of the filling pressure which is reached at the end of the filling phase and/or the overshooting or undershooting of a predefined pressure gradient in the pressure space of the incoming clutch unit can then be determined and be interpreted as the filling end. When the instantaneous pressure gradient is used, the sharp pressure rise toward the end of the filling phase can be determined and the overshooting of a predetermined correspondingly high pressure gradient can be utilized as a decision criterion for detecting the filling end. It is also possible, however, to determine the attenuation of the sharp pressure rise directly before the end of the filling phase and then use the undershooting of a correspondingly lower pressure gradient (after previous overshooting) as a decision criterion.

Alternatively or additionally to this, however, the determination of the filling end of the incoming clutch unit may also be carried out by a sensing of a commencing twisting of the power shift transmission. Since, in the event of a commencing twisting, part of the torque applied on the input side flows into the twisting of the transmission and the output-side torque consequently falls briefly, there is a reduction of vehicle acceleration in the event of a traction upshift and there is an increase in vehicle deceleration in the event of an overrun downshift. Consequently, advantageously, the vehicle acceleration or deceleration is sensed and the reaching and undershooting of a predefined acceleration or deceleration limit value is interpreted as the filling end. If, with the commencing takeover of a torque by the incoming clutch unit, the working pressure in the outgoing clutch is reduced automatically through the use of the continuous slip regulation, the working pressure in a pressure space of the outgoing clutch unit may also be sensed, and the reaching and undershooting of a predefined pressure limit value in the outgoing clutch unit are interpreted as the filling end. A commencing twisting of the transmission also results, in the case of a traction upshift, in a relaxation of the driven-side drive train which is of limited elasticity, is active as a torsion spring and which may include a cardan shaft, a differential transmission and in each case a drive shaft and which, in the traction mode, is wound up with a lead on the transmission side. Correspondingly, in the case of an overrun downshift, there is an intensification of the pretensioning of the driven-side drive train which, in the overrun mode, is wound up with a lag on the transmission side. In both shift situations, therefore, a relative movement of the transmission-side end of the driven-side drive train occurs with a lag on the transmission side with respect to the wheel-side end. This circumstance may be utilized in order to detect a commencing twisting of the transmission, specifically in that a transmission-side and a wheel-side rotational speed of the driven-side drive train are sensed, and the reaching and overshooting of a predefined positive difference between the wheel-side and the transmission-side rotational speed, the difference being corrected, if appropriate, by the amount of the transmission ratio of a differential transmission, is interpreted as the filling end.

At least the last method steps for determining the filling end, under some circumstances, do not, when applied alone in each case, make it possible to have an unequivocal interpretation, since, for example, changes in the vehicle acceleration and in the pretensioning of the driven-side drive train may also be brought about by external influences, such as, for example, by a change in the longitudinal inclination of the road and by unevennesses in the road surface. It is therefore advantageous if a plurality of the criteria described above are employed in order to determine the filling end. For this purpose, the respective method steps can initially be carried out independently of one another, the results can be assessed and the result values derived from these can be added up to form an assessment sum. Finally, the reaching and overshooting of a predefined sum limit value by the assessment sum can then be interpreted as the filling end. This then affords the greatest possible reliability in the determination of the filling end and consequently for the avoidance of a twisting or tensioning of the transmission.

Other features which are considered as characteristic for the invention are set forth in the appended claims.

Although the invention is illustrated and described herein as embodied in a method for a shift control of a power shift transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2A:
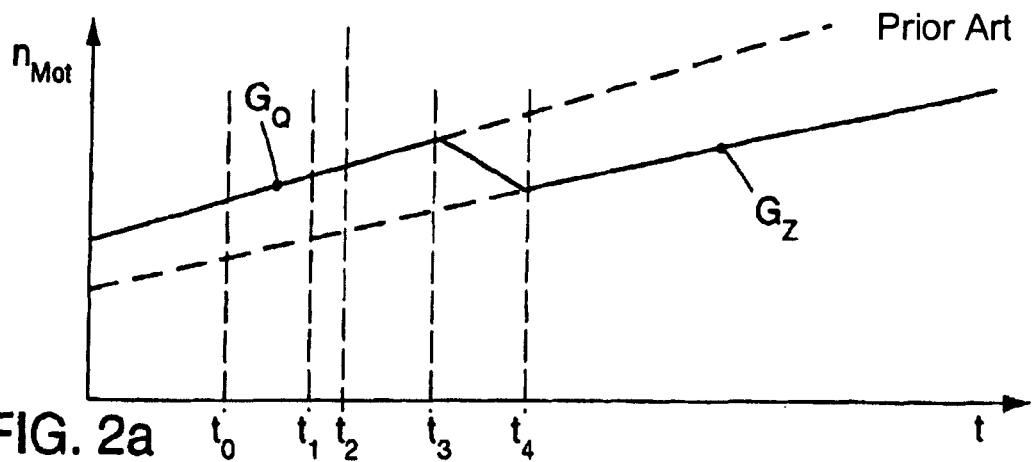
FIGS. 2a to 2c are graphs for illustrating the rotational speed, the engine torque and the torques of the clutch units for a traction upshift according to the prior art.
Figure 2B:
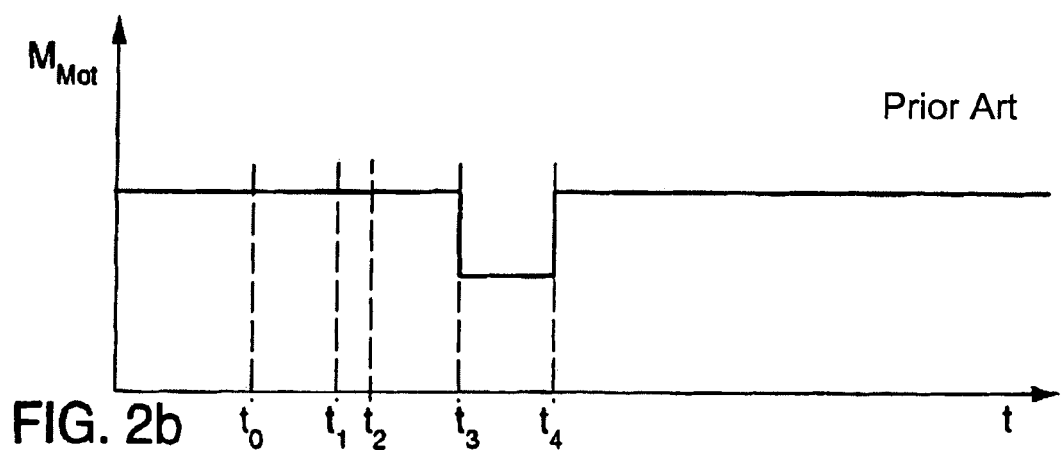
Figure 2C:
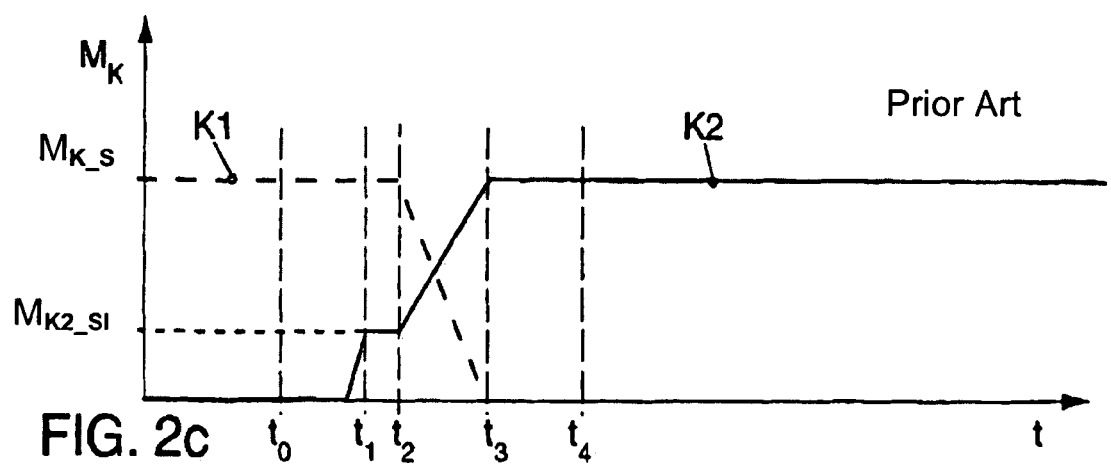

Referring now to the figures of the drawings in detail and first, particularly, to FIGS. 2a to 2c there is shown the rotational speed profile over time t and the torque profiles over time of a traction upshift according to the prior art. FIG. 2a illustrates the rotational speed profile of the engine $n_{Mot}(t)$. FIG. 2b illustrates the torque profile of the engine $M_{Mot}(t)$. FIG. 2c illustrates the torque profiles of the outgoing clutch unit $M_{K1}(t)$ and of the incoming clutch unit $M_{K2}(t)$. The shift commences with the filling, taking place from the time point $t_0$ to the time point $t_1$, of the incoming clutch unit K2, in which an assigned pressure space is filled with a pressure medium under a filling pressure $p_F$, and, toward the end of the filling phase, the corresponding clutch elements, for example, the clutch disks in the case of a multiple disk clutch, with the filling pressure $p_F$ reached, are brought to bear and the incoming clutch unit K2 transmits a low drag torque $M_{K2\_S1}$ which corresponds to about 15% of the shift torque $M_{K\_S}$ before and after the shift.

The duration of the filling phase depends not only on the structural conditions, but also essentially on the viscosity of the pressure medium (hydraulic oil) used and, in the present example, amounts to about 300 ms, but may take up to 1000 ms in the case of a cold start in extreme cold. So that the end of the filling phase can be reached reliably, a total of 400 ms is provided as a time window for filling the incoming clutch unit K2 from the time point $t_0$ to the time point $t_2$, so that, in the present case, a safety interval of 100 ms is obtained between the time points $t_1$ and $t_2$, with $t_1$ indicating the end of the filling of the incoming clutch K2 and $t_2$ indicating the start of the overlap of the clutches. This is followed, between the time points $t_2$ and $t_3$, by the overlap phase, in which the transmittable torque (clutch capacity) $M_{K1}$ of the outgoing clutch unit K1, which is assigned the lower old gear (source gear) $G_Q$, is reduced from the shift torque $M_{K\_S}$ to zero, and the clutch capacity $M_{K2}$ of the incoming clutch unit K2, which is assigned the higher new gear (target gear) $G_Z$, is increased from the drag torque $M_{K2\_S1}$ to the shift torque $M_{K\_S}$. Thus, during the overlap phase, which in the present case takes up about 300 ms, the largely constant engine torque $M_{Mot}$ or shift torque $M_{K\_S}$ is transferred continuously and without an interruption in traction from the old gear $G_Q$ or the assigned outgoing clutch unit K1 to the new gear $G_Z$ or the assigned incoming clutch unit K2. Subsequently, by appropriate action on the engine control (see FIG. 2a and FIG. 2b) a rotational speed adaption for the transition from the ratio of the old gear $G_Q$ to the ratio of the new gear $G_Z$ is carried out between the time points $t_3$ and $t_4$, over a period of about 300 ms, through the use of a brief lowering and raising again of the engine torque $M_{Mot}$. The entire shift operation lasts for about 1000 ms overall, about 700 ms elapsing up to a reaction detectable by a driver, to be precise the commencement of the rotational speed adaption at the time point $t_3$. In the case of manual triggering, a shift of this type is felt by the driver, particularly when the driver prefers a dynamic sporty drive, to be insufficiently spontaneous and, overall, to take place too slowly.

Figure 1A:
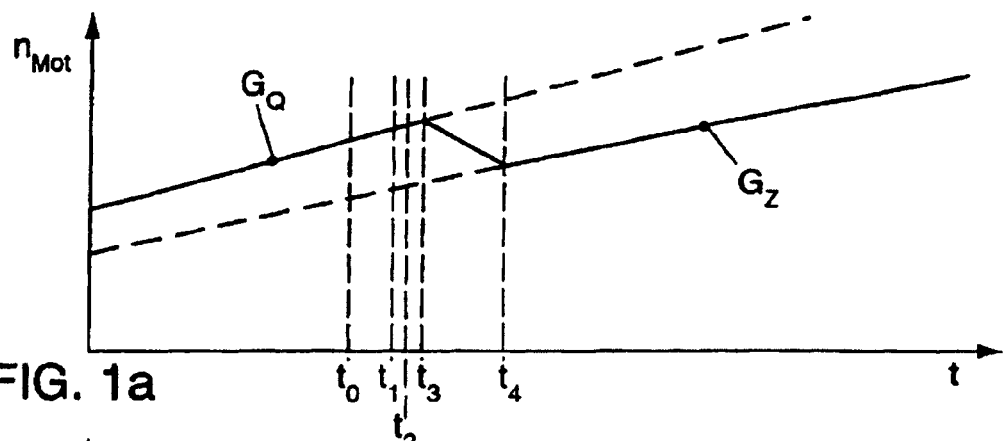
FIGS. 1a to 1c are graphs for illustrating the rotational speed, the engine torque and the torques of the clutch units for a traction upshift according to the invention.
Figure 1B:
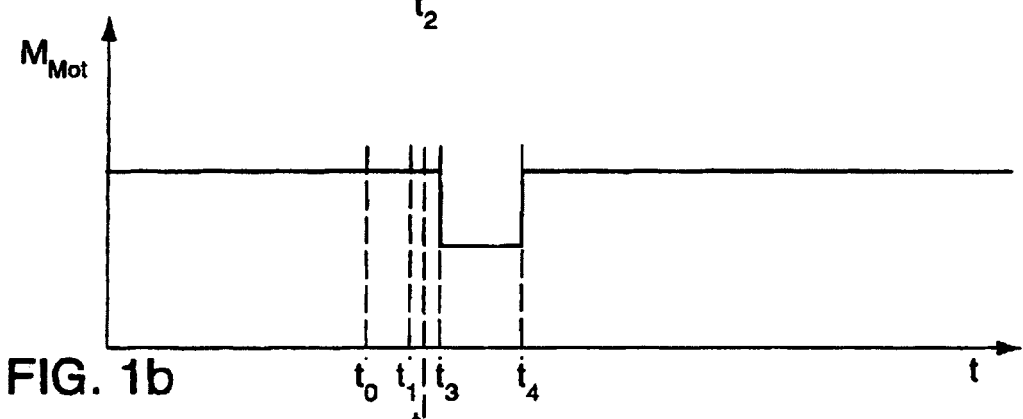
Figure 1C:
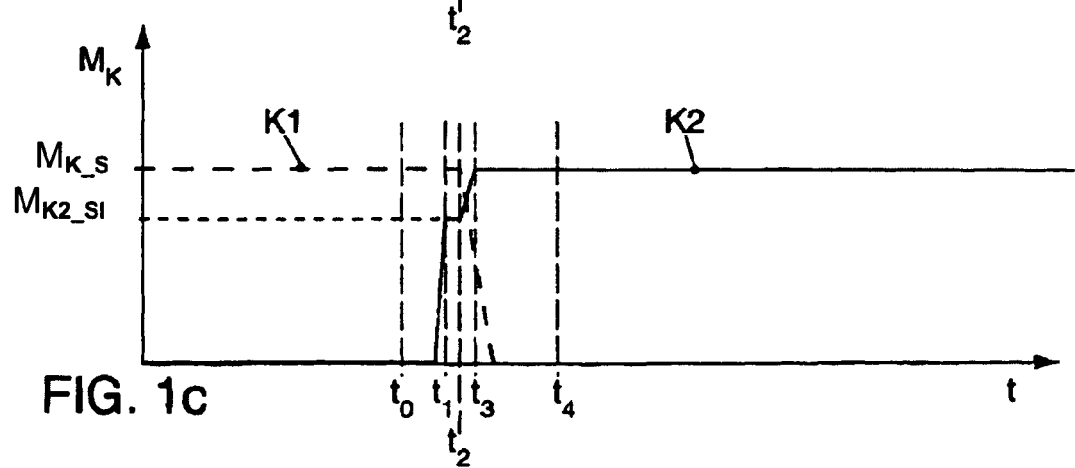

In contrast to the above-described upshift, a comparable traction upshift, which takes place by being controlled by the method according to the invention, as illustrated in FIGS. 1a to 1c, takes place in a substantially more spontaneous manner and more quickly. Here, according to the invention, in the filling phase between the time point $t_0$ and the time point $t_1$, the incoming clutch unit K2 is filled with an increased filling pressure $p_F$ which corresponds to a drag torque $M_{K2\_S1}$ or a clutch capacity of about 85% of the shift torque $M_{K\_S}$. In the present case, therefore, the filling phase takes up only about 100 ms.

In order to avoid a twisting or tensioning of the transmission, the filling end is ascertained, and this may be carried out by sensing the filling pressure $P_F$ of the incoming clutch unit K2 and/or by sensing a commencing twisting of the respective transmission. Due to the processing of corresponding sensor signals and to the triggering of the clutch overlap in a corresponding control unit, about 25 ms elapse from the reaching of the filling end at the time point $t_1$ until the commencement of the clutch overlap at the time point $t_2$. The overlap phase, which takes place between the time points $t_2$ and $t_3$ and in which the transmittable torque (clutch capacity) $M_{K1}$ of the outgoing clutch unit K1, which is assigned the lower old gear $G_Q$, is reduced from the shift torque $M_{K\_S}$ to zero and the clutch capacity $M_{K2}$ of the incoming clutch unit K2, which is assigned the higher new gear $G_Z$, is increased from the drag torque $M_{K2\_S1}$ to the shift torque $M_{K\_S}$, becomes particularly short, at about 50 ms, on account of a rapid opening of the outgoing clutch unit K1 and of the high filling pressure $p_F$ of the incoming clutch unit K2.

As already described above, this is followed, between the time points $t_3$ and $t_4$, over about 300 ms, by a rotational speed adaption, controlled via the engine control, for the transition from the transmission ratio of the old gear $G_Q$ to the transmission ratio of the new gear $G_Z$ (see FIG. 1a and FIG. 1b). The entire shift operation in this case lasts, overall, only about 475 ms, only about 175 ms elapsing up to the reaction detectable by a driver, namely the commencement of the rotational speed adaption at the time point $t_3$. A driver experiences a detectable improvement in shift spontaneity when the method according to the invention is used. The method thus makes it possible to have a dynamic sporty way of driving which the driver generally also wants when the driver changes from an automatic mode to a manual mode of the transmission control.

We claim:

1. A method for a shift control of a power shift transmission, the method which comprises:
    providing slip-regulated wet clutches operating respectively as an incoming clutch unit and an outgoing clutch unit;
    closing the incoming clutch unit assigned to a new gear and opening the outgoing clutch unit assigned to an old gear such that the closing and the opening overlap in time;
    closing the incoming clutch unit substantially up to a working pressure corresponding to a clutch capacity of the outgoing clutch unit after performing a filling operation for providing a filling pressure for the incoming clutch unit, the filling operation being concluded by a filling end; and
    performing, in case of a manually triggered power shift, the filling operation for the incoming clutch unit with an increased filling pressure corresponding to an order of magnitude of the clutch capacity of the outgoing clutch unit, ascertaining the filling end, and after the filling end is identified, opening the outgoing clutch unit and adapting a clutch capacity of the incoming clutch unit such that the opening of the outgoing clutch unit and the adapting of the clutch capacity overlap in time.

2. The method according to claim 1, which comprises setting the filling pressure of the incoming clutch unit at substantially between 80% and 90% of a pressure level corresponding to the clutch capacity of the outgoing clutch unit.

3. The method according to claim 1, which comprises setting the filling pressure of the incoming clutch unit at substantially 100% of a pressure level corresponding to the clutch capacity of the outgoing clutch unit.

4. The method according to claim 1, which comprises accelerating the step of opening the outgoing clutch unit by switching the outgoing clutch unit pressureless via a throttle that is enlarged as compared with a normal operation.

5. The method according to claim 1, which comprises ascertaining the filling end of the incoming clutch unit by sensing a working pressure in a pressure space of the incoming clutch unit.

6. The method according to claim 1, which comprises ascertaining the filling end of the incoming clutch unit by determining a pressure gradient of a working pressure in a pressure space of the incoming clutch unit.

7. The method according to claim 5, which comprises interpreting a reaching and overshooting of a given pressure limit value in the incoming clutch unit as the filling end.

8. The method according to claim 6, which comprises interpreting an overshooting or undershooting of a given pressure gradient value in the incoming clutch unit as the filling end.

9. The method according to claim 1, which comprises ascertaining the filling end of the incoming clutch unit by sensing a commencing twisting of a power shift transmission.

10. The method according to claim 1, which comprises:
    sensing a vehicle acceleration or vehicle deceleration; and
    interpreting a reaching and undershooting of a given acceleration limit value or given deceleration limit value as the filling end.

11. The method according to claim 1, which comprises:
    sensing a working pressure in a pressure space of the outgoing clutch unit; and
    interpreting a reaching and undershooting of a given pressure limit value in the outgoing clutch unit as the filling end.

12. The method according to claim 1, which comprises:
    sensing a transmission-side rotational speed and a wheel-side rotational speed of a driven-side drive train; and
    interpreting a reaching and overshooting of a given positive difference between the wheel-side rotational speed and the transmission-side rotational speed as the filling end.

13. The method according to claim 1, which comprises:
    performing at least two ascertaining steps selected from the group consisting of ascertaining the filling end of the incoming clutch unit by sensing a working pressure in a pressure space of the incoming clutch unit, ascertaining the filling end of the incoming clutch unit by determining a pressure gradient of a working pressure in a pressure space of the incoming clutch unit, ascertaining the filling end of the incoming clutch unit by interpreting a reaching and overshooting of a given pressure limit value in the incoming clutch unit, ascertaining the filling end of the incoming clutch unit by interpreting an overshooting or undershooting of a given pressure gradient value in the incoming clutch unit, ascertaining the filling end of the incoming clutch unit by sensing a commencing twisting of a power shift transmission, ascertaining the filling end of the incoming clutch unit by sensing a vehicle acceleration or vehicle deceleration and interpreting a reaching and undershooting of a given acceleration limit value or given deceleration limit value, ascertaining the filling end of the incoming clutch unit by sensing a working pressure in a pressure space of the outgoing clutch unit and interpreting a reaching and undershooting of a given pressure limit value in the outgoing clutch unit, and ascertaining the filling end of the incoming clutch unit by sensing a transmission-side rotational speed and a wheel-side rotational speed of a driven-side drive train and interpreting a reaching and overshooting of a given positive difference between the wheel-side rotational speed and the transmission-side rotational speed;

evaluating respective results of the at least two ascertaining steps and deriving respective result values from the respective results of the at least two ascertaining steps;

forming an evaluation sum by adding up the respective result values; and interpreting a reaching and overshooting of a given sum limit value by the evaluation sum as the filling end.

14. The method according to claim 1, which comprises performing the filling operation with the increased filling pressure in case of a manually triggered traction upshift in a motor vehicle.

15. The method according to claim 1, which comprises performing the filling operation with the increased filling pressure in case of a manually triggered overrun downshift in a motor vehicle.

* * * * *